UNITED STATES PATENT OFFICE.

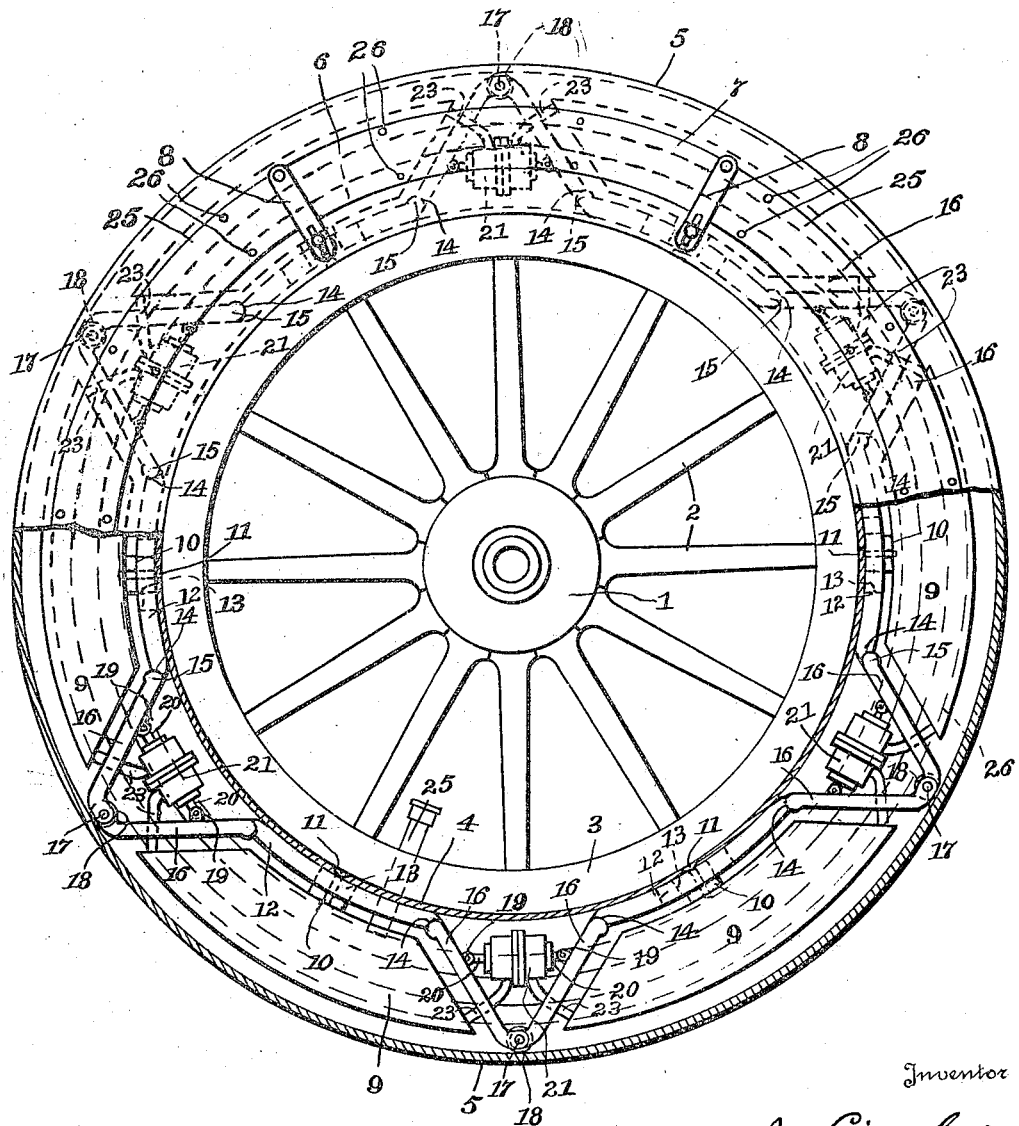

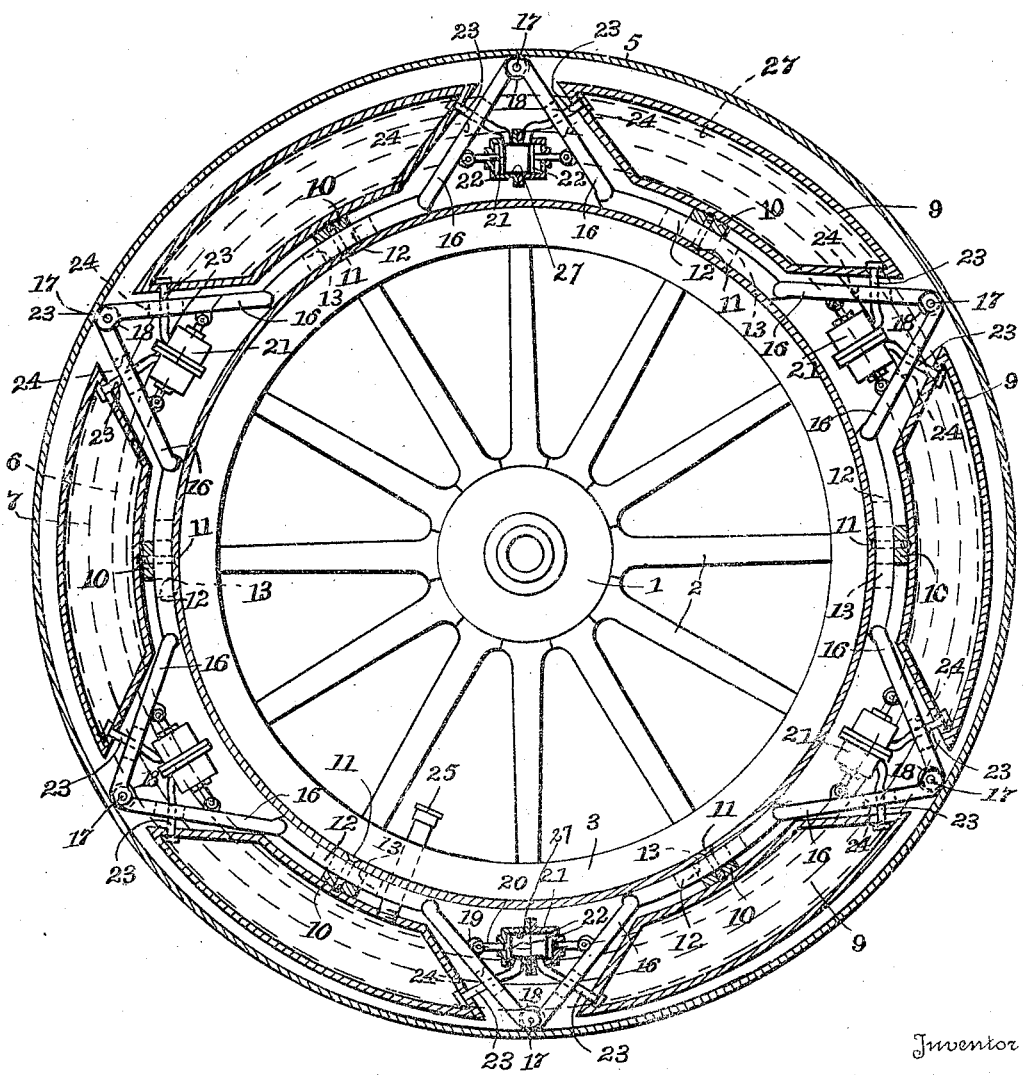

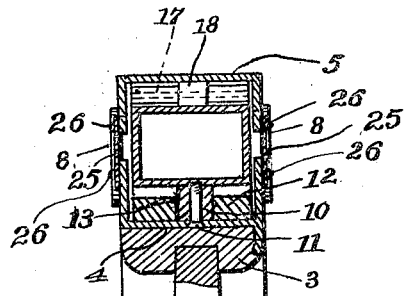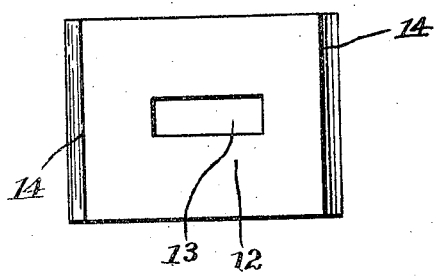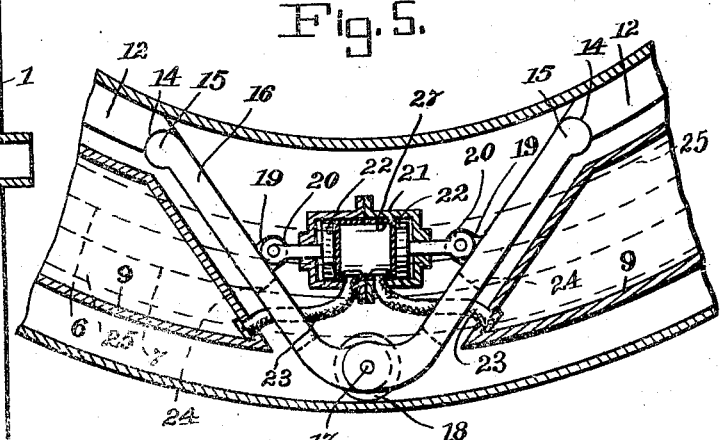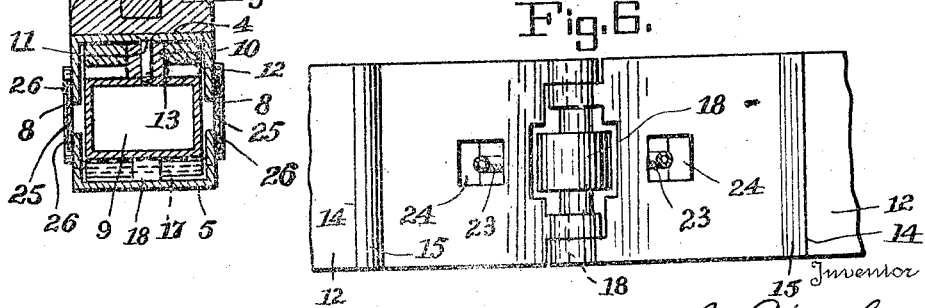

OTTO J. EISELE, OF NEW YORK, N. Y.

VEHICLE-TIRE.

1,380,786. Specification of Letters Patent. Patented June 7, 1921.

Application filed January 17, 1920, Serial No. 352,060. Renewed November 10, 1920. Serial No. 423,176.

*To all whom it may concern:*

Be it known that I, OTTO J. EISELE, a citizen of the United States, residing at New York, in the county and State of New York, have invented certain new and useful Improvements in Vehicle-Tires, of which the following is a full, clear, and exact specification.

This invention relates to vehicle tires, and has for its object to provide an improved resilient tire using compressed air as the cushioning medium but which is not subject to puncture or other objections commonly found in ordinary pneumatic tires.

The invention will be first hereinafter described in connection with the accompanying drawings, which constitute part of this specification, and then more specifically defined in the claims at the end of the description.

In the accompanying drawings, wherein similar reference characters are used to designate corresponding parts throughout the several views:—

Figure 1 is a side elevation, partly in section, of a vehicle tire constructed substantially in accordance with this invention and applied to an ordinary wheel.

Fig. 2 is a section view of the tire on the wheel showing the relative positions of the parts when under a load.

Fig. 3 is a vertical central section of the wheel and tire showing the parts in the same positions as in Fig. 1.

Fig. 4 is a detailed plan view of one of the sliding members arranged between the air reservoirs and the inner rim.

Fig. 5 is a section view of a portion of the tire on a larger scale to illustrate the hinged arms and compression cylinder more clearly, and Fig. 6 is an under plan view of said arms, as they appear in Fig. 5, with the air reservoirs removed.

In Figs. 1, 2 and 3 of the drawings, 1 designates the hub of an ordinary vehicle wheel having spokes 2 and felly 3. Around said felly is suitably secured a rim 4 hereinafter referred to as the inner rim. Spaced from said inner rim is an outer rim 5 which may constitute the tread of the tire. The rims 4 and 5 are provided with flanges 6 and 7, respectively, extending toward each other at the edges of the rims, and in the space partially housed between said rims by said flanges the cushioning means are mounted.

Said cushioning means consists of a plurality of air reservoirs 9 carried by the inner rim and spaced apart entirely around the tire, and air compressing means extending between the inner and outer rims and arranged between adjacent reservoirs. The reservoirs 9 are preferably arcuate in form, as shown in the drawings, so as to conform to the curvature of the tire and felly of the wheel. Each reservoir is attached to the inner rim 4 by a block 10, which may be soldered, brazed or otherwise secured to the inner face of the reservoir, and a screw or bolt 11 which passes outwardly through the inner rim and engages said block, which also serves to support the reservoir spaced away from the inner rim.

The air compressing means comprises pairs of foldable arms 16 normally arranged at an acute angle to each other and extending between the inner and outer rims in the spaces between adjacent reservoirs 9. The outer ends of each pair of arms 16 are hinged together by a pintle 17, as best shown in Figs. 5 and 6, and said pintle also carries a roller 18 having antifriction engagement with the outer rim. The inner ends of said arms 16 are formed with rounded or cylindrical surfaces 15 to fit as knuckle joints in grooves 14 in sliding members or plates 12 one of which is arranged between each of the reservoirs and the inner rim. Each member 12 is arcuate in form to fit the inner rim on which it is adapted to slide, and each of said members 12 is provided with a slot 13 to loosely fit around the block 10, the slot being longer than the block to permit the sliding movement of said member.

Each of the arms 16 is formed with a slot 24 through which hose pipes 23 extend for coupling up the reservoirs 9 with the compression cylinders 21 one of which is arranged between each pair of arms. The arms 16 also have lugs 19 projecting inwardly intermediate of their ends, and to said lugs there are pivoted piston rods 20 which extend loosely through the ends of the cylinders 21, as best shown in Fig. 6, so as to contact with piston heads or disks 22 in the ends of the cylinders. The hose pipes 23 communicate with each cylinder near the center of the latter, that is intermediate of its ends, so that the piston heads may move inwardly toward the center of the cylinder during the compression of the air therein without cutting off communication with said pipes.

Before the tire is subjected to a load the several pairs of foldable arms arranged at intervals around the same are held in substantially the same relative positions, as illustrated in Figs. 1 and 3, by compressed air which is forced into the reservoirs and cylinders through an ordinary filling nozzle or valve tube 25 communicating with one of the reservoirs. The air pressure in said reservoirs and cylinders may be about one hundred pounds when in use, and this pressure will be equal all around the tire prior to its being subjected to a load. When a load is placed on the tire, however, the lower portion of the outer rim, which is in contact with the road will be forced upward, as shown in Fig. 2, causing the pairs of arms 16 below the horizontal center of the wheel to be spread apart and the arms above said horizontal center to be pushed closer together, due to the sliding movement of the members 12 connecting said arms. The result is that the pressure of air in the cylinders 21 below the horizontal center of the wheel is reduced by the withdrawal or outward movement of the piston rods 20 as the arms are spread apart, while the pressure in the cylinders above the horizontal center is increased by the inward movement of the piston rods and heads 22 as the arms are pushed toward each other. The difference in pressure at the bottom and top of the wheel will soon be equalized if the wheel remains stationary, but when it is running or revolving the constant changing of the pressure in the several cylinders will produce a superior cushioning or pneumatic effect which will insure comfortable riding.

The outer rim is preferably made of steel or other material which is not subject to puncture, as are also the reservoirs 9. The flanges 6 and 7 on the rims may be loosely connected together at intervals around the tire by links 8 which do not interfere with the displacement of the outer rim under running conditions but prevent said outer rim from simply revolving around on the rollers 18 which would destroy the traction of the tire.

The annular spaces between the flanges 6 and 7 at the sides of the tire may also be covered by strips 25 of rubber or other suitable elastic material which will exclude dust and dirt but not interfere with the displacement of the outer rim as already explained. Said strips 25 may be secured to the flanges by bolts 26 or other suitable fastening means.

The cylinders 21 are preferably lined, as best shown in Fig. 5, with rubber bags 27 which are connected to the hose pipes 23 and through which the air passes from one reservoir 9 to the next. These bags cannot be inflated sufficiently to cause them to break on account of the restricting walls of the cylinders and the loose piston heads, the latter acting to compress said bags in the cylinders at the upper portion of the wheel when the tire is under a load as previously explained.

Having thus described my invention, what I claim as new and desire to secure by Letters Patent of the United States is:—

1. A vehicle tire comprising an inner and an outer rim, rigid air reservoirs arranged between said rims, out of contact with the same, means in contact with the outer rim and also arranged between the reservoirs for compressing the air in said reservoirs when the tire is under a load and connections between said compressing means arranged to slide between the inner rim and the reservoirs.

2. In a vehicle tire, the combination with an inner and an outer rim, of rigid reservoirs arranged in spaced relation between said rims entirely around the tire, said reservoirs being out of contact with the outer rim, and means arranged between said reservoirs and in contact with both rims for permitting the outer rim to be displaced under a load and compress the air in said reservoirs.

3. In a vehicle tire, the combination with an inner rim, of an outer rim spaced therefrom, reservoirs arranged in spaced relation between said rims entirely around the tire and spaced from the outer rim, means of air communication between said reservoirs, and means arranged between the reservoirs and between the rims in contact with both of them for compressing the air in said reservoirs and permitting said outer rim to become displaced under a load.

4. In a vehicle tire, the combination with an inner rim, of an outer rim spaced therefrom, reservoirs supported on the inner rim and spaced from the outer rim, said reservoirs being spaced apart entirely around the tire, means of air communication between said reservoirs, and compressible members arranged between said rims in contact with both and intermediate of the reservoirs for compressing the air in said reservoirs and permitting the outer rim to be displaced under a load.

5. In a vehicle tire, the combination with an inner rim, of an outer rim spaced therefrom, said rims having lateral flanges extending toward each other, air reservoirs supported on the inner rim between said flanges in spaced relation to each other entirely around the tire and also spaced from the outer rim, means of air communication between said reservoirs also arranged between said flanges, and compressible members in contact with both rims and arranged between adjacent pairs of reservoirs for compressing the air in said reservoirs and permitting the outer rim to be displaced under a load.

6. In a vehicle tire, the combination with an inner rim, of an outer rim spaced therefrom, said rims having lateral flanges extending toward each other, means for loosely connecting said rims together by their flanges, air reservoirs supported on the inner rim between said flanges in spaced relation to each other entirely around the tire and also spaced from the outer rim, means of air communication between said reservoirs, and compressible members in contact with both rims between the flanges and arranged between adjacent reservoirs for compressing the air in said reservoirs and permitting the outer rim to be displaced under a load.

7. In a vehicle tire, the combination with an inner rim, of an outer rim spaced therefrom, air reservoirs supported on the inner rim and spaced away from the outer rim, compression cylinders arranged between adjacent reservoirs and in communication therewith, and compressible members in contact with both rims and adapted to compress the air in said cylinders and reservoirs and permit the outer rim to be displaced under a load.

8. In a vehicle tire, the combination with an inner rim, of an outer rim spaced therefrom, air reservoirs spaced from the outer rim around the tire, blocks supporting said reservoirs from the inner rim and spaced therefrom, sliding members having slots through which said blocks extend, said members being slidable between the reservoirs and the inner rim, foldable arms hinged together and to the ends of said slidable members and arranged between the rims, and means for compressing the air in said reservoirs when the outer rim is displaced under a load, said compressing means acting through said slidable members entirely around the tire.

9. In a vehicle tire, the combination with an inner rim, of an outer rim spaced therefrom, air reservoirs carried by the inner rim and spaced from the outer rim and from each other, slidable members movable between said reservoirs and the inner rim, pairs of foldable arms hinged together and to adjacent sliding members, rollers carried by said arms to bear upon the outer rim, and means for compressing the air in said reservoirs when the outer rim is displaced under a load, said compressing means acting through said foldable arms and slidable members entirely around the tire.

10. In a vehicle tire, the combination with an inner rim, of an outer rim spaced therefrom, air reservoirs carried by the inner rim and spaced from the outer rim and from each other, slidable members movable between said reservoirs and the inner rim, pairs of foldable arms hinged together and to adjacent sliding members, said arms having slots therein, and hose connections between adjacent reservoirs extending through said slots.

11. In a vehicle tire, the combination with an inner rim, of an outer rim, spaced therefrom, air reservoirs carried by the inner rim and spaced from the outer rim and from each other, slidable members movable upon the inner rim, compression cylinders arranged between adjacent air reservoirs entirely around the tire and communicating with said reservoirs, pairs of foldable arms hinged together and to said slidable members, and means carried by said arms for compressing the air in said cylinders and reservoirs when the outer rim is displaced under a load.

12. In a vehicle tire, the combination with an inner rim, of an outer rim spaced therefrom, air reservoirs carried by the inner rim and spaced from the outer rim and from each other, slidable members movable upon the inner rim, compression cylinders arranged between adjacent air reservoirs and communicating therewith from near the centers of the cylinders, piston heads in the ends of said cylinders, pairs of foldable arms hinged together and to said slidable members and extending between the rims, and piston rods pivoted to said arms and engaging the piston heads in the cylinders, whereby the air in said cylinders and reservoirs is compressed when the outer rim is displaced under a load.

13. In a vehicle tire, the combination with an inner rim, of an outer rim spaced therefrom and displaceable under a load, resilient means interposed between said rims, elastic strips closing the spaces at the sides of the tire between said rims, and rigid links positively connecting said rims together at intervals, each of said links having one end attached to one of the rims to slide thereon for permitting the displacement of the outer rim.

14. In a vehicle tire, the combination with an inner rim, of an outer rim spaced therefrom, air reservoirs arranged between said rims, compression cylinders arranged alternately with said reservoirs, pipes placing said cylinders and reservoirs into communication with one another, bags lining said cylinders and communicating with said pipes, and means also arranged between said rims for compressing said bags in the cylinders when the tire is under a load.

In testimony whereof I have signed my name to this specification.

OTTO J. EISELE.